United States Patent [19]

Schreckenberg et al.

[11] Patent Number: 4,927,903

[45] Date of Patent: May 22, 1990

[54] DIPHENOL MONOESTERS OF CARBOXYLIC ACIDS, A PROCESS FOR THEIR PREPARATION, THEIR USE FOR THE PREPARATION OF POLYESTER-CARBONATES, THE POLYESTER-CARBONATES OBTAINABLE ACCORDING TO THE INVENTION AND FLAME-REPELLENT MOULDING COMPOSITIONS

[75] Inventors: Manfred Schreckenberg; Rolf Dhein; Hans Rudolph; Nouvertné Werner, all of Krefeld, Fed. Rep. of Germany

[73] Assignee: Bayer Aktiengesellschaft, Bayerwerk, Fed. Rep. of Germany

[21] Appl. No.: 861,768

[22] Filed: May 9, 1986

Related U.S. Application Data

[63] Continuation of Ser. No. 616,341, Jun. 1, 1984, abandoned.

[30] Foreign Application Priority Data

Jun. 4, 1983 [DE] Fed. Rep. of Germany ....... 3320260

[51] Int. Cl.$^5$ .............................................. C08J 5/49
[52] U.S. Cl. ...................... 528/176; 560/86; 524/710; 524/141; 524/124
[58] Field of Search ..................... 528/176; 560/86; 524/710, 141, 124

[56] References Cited

U.S. PATENT DOCUMENTS

| | | | |
|---|---|---|---|
| 3,816,373 | 6/1974 | Hoogeboom | 260/47 X |
| 3,897,391 | 7/1975 | Jaquiss et al. | 260/47 X |
| 3,988,908 | 11/1976 | Beare et al. | 68/12 R |
| 3,998,908 | 12/1976 | Buxbaum | 260/860 |
| 4,001,184 | 1/1977 | Scott | 260/47 X |
| 4,129,594 | 12/1978 | Baker et al. | 260/544 |
| 4,156,089 | 5/1979 | Smith | 560/55 |
| 4,169,868 | 10/1979 | Schreckenberg et al. | 525/439 |
| 4,196,276 | 4/1980 | Schreckenberg et al. | 528/176 |
| 4,338,422 | 7/1982 | Jackson, Jr. et al. | 525/461 |
| 4,360,695 | 11/1982 | Magnussen et al. | 562/590 |

FOREIGN PATENT DOCUMENTS

| | | |
|---|---|---|
| 1260479 | 2/1968 | Fed. Rep. of Germany . |
| 3026937 | 1/1981 | Fed. Rep. of Germany . |
| 898775 | 6/1962 | United Kingdom . |
| 954500 | 4/1964 | United Kingdom . |
| 1159924 | 7/1969 | United Kingdom . |
| 1274575 | 5/1972 | United Kingdom . |
| 1290821 | 9/1972 | United Kingdom . |

*Primary Examiner*—John Kight
*Assistant Examiner*—M. L. Moore
*Attorney, Agent, or Firm*—Joseph C. Gil; Aron Preis

[57] ABSTRACT

The present invention relates to diphenol monoesters of carboxylic acids, a process for their preparation, their use for the preparation of polyester-carbonates, the polyester-carbonates obtainable according to the invention and flame-repellent moulding compositions containing these polyester-carbonates.

5 Claims, No Drawings

DIPHENOL MONOESTERS OF CARBOXYLIC ACIDS, A PROCESS FOR THEIR PREPARATION, THEIR USE FOR THE PREPARATION OF POLYESTER-CARBONATES, THE POLYESTER-CARBONATES OBTAINABLE ACCORDING TO THE INVENTION AND FLAME-REPELLENT MOULDING COMPOSITIONS

This application is a continuation of application Ser. No. 616,341 filed June 1, 1984, now abandoned.

SUMMARY OF THE INVENTION

The process for preparing the polyester-carbonates of the present invention entails first a process for the preparation of diphenol monoesters of carboxylic acids, wherein carboxylic acids are reacted with high-molecular weight polycarbonates, in the presence of a catalyst at temperatures between 150° C. and 350° C., $CO_2$ being split off and which process is characterized in that one diphenol polycarbonate equivalent is being employed per carboxylic acid group of the carboxylic acid employed. For instance, terephthalic acid and bisphenol A polycarbonate react as follows:

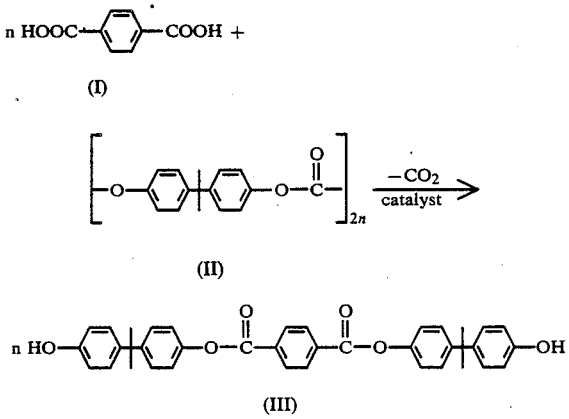

In the context of the present invention the diphenol monoesters of carboxylic acids are in particular those of monocarboxylic acids, dicarboxylic acids, tri-carboxylic acids and tetracarboxylic acids, that is to say monocarboxylic acid (diphenol) monoesters, dicarboxylic acid bis-(diphenol) monoesters, tricarboxylic acid tris-(diphenol) monoesters and tetracarboxylic acid tetrakis-(diphenol) monoesters.

The diphenol monoesters are then used for the preparation of polyester-carbonates by the phase boundary process or by the pyridine process.

The polyester-carbonates obtainable by the process according to the invention are particularly suitable in the context of flame resistant molding compositions.

BACKGROUND OF THE INVENTION

Aromatic dicarboxylic acid chlorides which are used for the preparation of aromatic oligomeric and polymeric bisphenol esters are prepared according to U.S. Pat. No. 4,129,594, the case of the simplest terephthalic acid bis-bisphenol A ester, for example, being included. The polyesters can be further converted into polyester-carbonates by reaction with $COCl_2$. The particular bis-bisphenol A esters cannot be isolated in this preparation method, rather, a mixture of bisphenol esters with very diverse degrees of polymerization is in each case obtained, which has the result that the polyester-polycarbonates obtained from these mixtures with $COCl_2$ do not have a controlled segment build-up.

Corresponding comments apply to DE-OS (German Published Specification) No. 3,026,937.

In another synthesis route for polyester-carbonates, finished polycarbonate is used as the starting material (see, for example, U.S. Pat. No. 3,998,908, British Patent Specification No. 954,500 and British Patent Specification No. 898,775). In this melt process, the polycarbonates can be partly degraded (U.S. Pat. No. 3,988,908) while they are reacted with the end groups of the polyesters. However, complete degradation of the polycarbonates with reaction of the COOH groups of the polyesters is neither intended here, nor should it take place de facto (see, for example, U.S. Pat. No. 3,998,908, column 4, lines 47–54 and column 2, lines 56–61 and column 6, lines 8–46).

In the preparation of branched polycarbonates, branching agents containing carboxylic acid are likewise incorporated (see British Patent Specification No. 1,159,924, U.S. Pat. Nos. 3,816,373 and 4,001,184). However, in this case also, no monomeric ester-triphenols or ester-tetraphenols and the like are obtained.

According to German Patent Specification No. 2,254,918 (LeA 14,711), ortho-esters containing phenolic OH groups are prepared and are used as branching agents for thermoplastic polycarbonates. The ortho-esters are prepared by transesterification of ortho-acrylates with diphenols, that is to say by a process different from that of the present invention.

Bisphenol A tetraphthalate-carbonate copolymers and their preparation from bisphenol A, tetraphthalyl chloride, phenols and phosgene are described according to DE-OS (German Published Specification) No. 2,714,544. However, in our opinion, the polyester-carbonates having the regular structure build-up according to the present invention are not achieved by the process of this literature reference.

According to European Patent Specification No. 2,218 (LeA 18,544), aromatic polyesters are prepared in the presence of aromatic polycarbonates by a transesterification process, also using bisphenols and diaryl esters of aromatic dicarboxylic acids. This process also does not give the polyester-carbonates of the present invention having the regular structure build-up.

De-OS (German Published Specification) No. 2,636,783 (LeA 16,689) and DE-OS (German Published Specification) No. 702,626 (LeA 17,356) describe the direct incorporation of carboxylic acids above a certain molecular weight together with diphenols and phosgene by the phase boundary process for the preparation of polyester-carbonates. Again, it cannot be expected that the polyester-carbonates of the present invention having the regular structure build-up are obtained.

DETAILED DESCRIPTION OF THE INVENTION

Bisphenol polycarbonate equivalent in the context of the present invention is the structural unit of the following formula

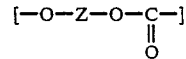

wherein Z is a derivative of a diphenol, HO—Z—OH, which is free from ester groups.

Examples of catalysts which are suitable, according to the invention, for the preparation of the ester diphenols are 5-membered, heterocyclic compounds, such as imidazole, pyrazole, indazole, 1,2,3-triazole, 1,2,4-triazole, benzimidazole, benzotriazole, 3-amino-1,2,4-triazole, 3-amino-1,2,4-triazole-5-carboxylic acid, tetrazole, 5-amino-tetrazole and amidine or salts of tertiary organic amines, tri- and tetra-alkylammonium hydroxides or alkali metal oxides, hydroxides, alcoholates, carbonates, sulphates or phosphonates.

The catalyst is used in amounts between 0.001 and 10% by weight, preferably 0.01 to 1% by weight, based on the total weight of the reaction mixture employed.

The preferred reaction temperatures are between 180° C. and 250° C.

The preparation, according to the invention, of the ester phenolates is preferably carried out in the absence of solvents for the reactants, that is to say in substance. However, solvents for the carboxylic acids and/or for the polycarbonate can also be used, such as chlorobenzene, toluene, xylene, benzene or chlorinated hydrocarbons.

The reaction time for the preparation of the ester phenols is between 2 and 60 hours, depending on the reaction temperature and the nature and amount of the catalyst.

The phenol which is formed in the reaction and results from the chain limiters of the polycarbonates used is removed by subsequent vacuum distillation.

Carboxylic acids which can be used according to the invention are monocarboxylic acids, dicarboxylic acids, tricarboxylic acids, tetracarboxylic acids and any desired higher carboxylic acids. The carboxylic acids which can be used according to the invention may be aromatic, aliphatic, cycloaliphatic, araliphatic or heterocyclic carboxylic acids. They can be used singly or as mixtures with one another. Carboxylic acids which can be used according to the invention are, in particular, those of the formula (IV)

$$A(COOH)_p \quad (IV)$$

wherein

"A" is a "p"-valent, saturated or unsaturated aliphatic radical with preferably 1 to 20 C atoms, a cycloaliphatic radical with preferably 5 or 6 C atoms, an araliphatic radical with preferably 7–15 C atoms or a heterocyclic radical which has 3 to 12 C atoms and contains any of the hetero-atoms N, O and S, and "p" is an integer from 1 to 4, preferably 2 or 3. If p=2, —A— can be a single bond.

Aromatic radicals A in the context of this definition are, for example, also those having the following structure

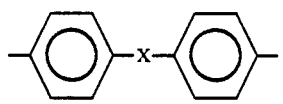

wherein

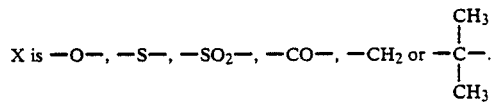

Examples of carboxylic acids of the formula (IV) are oxalic acid, malonic acid, succinic acid, glutaric acid, adipic acid, trimethyladipic acid, azelaic acid, sebacic acid, decanedicarboxylic acid, dodecanedicarboxylic acid, hydrogenated dimeric and hydrogenated trimeric fatty acids (for example from oleic acid or talloleic acid), fumaric acid, maleic acid, hexahydroterephthalic acid, phthalic acid, isophthalic acid, terephthalic acid, benzene-1,3,5-tricarboxylic acid, benzene-1,2,4-tricarboxylic acid, benzene-1,2,3-tricarboxylic acid, naphthalene-1,5-dicarboxylic acid, benzophenone-4,4'-dicarboxylic acid, diphenyl-sulphone-4,4'-dicarboxylic acid, butane-tetracarboxylic acid, ethylene-tetracarboxylic acid, pyromellitic acid, benzene-1,2,3,4-tetracarboxylic acid, benzene-1,2,3,5-tetracarboxylic acid and compounds of the following formulae

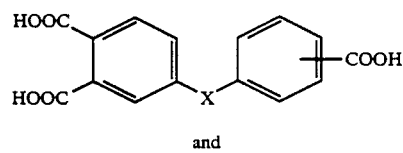

and

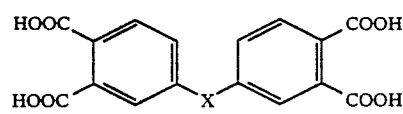

wherein

X corresponds to the radicals —O—, —S—, —SO$_2$—,

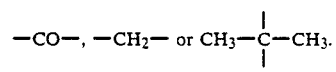

Carboxylic acids which can be used according to the invention are, in particular, also carboxylic acids containing phenolic OH groups, and especially those of the formula (V)

wherein

"A", is one of the aromatic radicals mentioned for formula (IV) and

"s" and "t" independently are integers from 1 to 3, preferably 1 or 2.

Examples of carboxylic acids of the formula (V) containing phenolic OH groups are 2-, 3- or 4-hydroxybenzoic acid, (α-hydroxybenzene)-acetic acid, hydroxynaphthalenecarboxylic acids, hydroxy-diphenyl-acetic acid, hydroxyanthracenecarboxylic acids, 2,4-dihydroxy-benzoic acid, 3,5-dihydroxybenzoic acid, 3,5-dihydroxy-2-naphthalenecarboxylic acid, 4,4'-dihydroxy-(1,1'-biphenyl)-2-carboxylic acid, 4,4'-bis-(4-hydroxyphenyl)-pentanoic acid, 3,4,5-trihydroxybenzoic acid, 4-hydroxy-1,3-benzene-dicarboxylic acid, 4-hydroxy-1,2-benzenedicarboxylic acid, 4,6-dihydroxy-1,3-benzenedicarboxylic acid, 2,5-dihydroxy-1,4-benzenedicarboxylic acid and 3,3'-methylenebis-(6-hydroxy)-5-methylbenzoic acid.

Dicarboxylic acids which can be used according to the invention are also the esters, containing carboxyl groups, of the formula (VI)

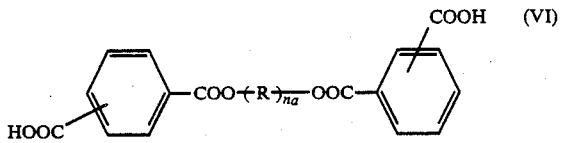

or of the formula (VII)

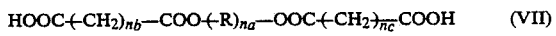

wherein

R is a divalent $C_6$–$C_{14}$ aromatic radical, a $C_7$–$C_{20}$ araliphatic radical, a $C_2$–$C_{20}$ aliphatic radical or a $C_5$–$C_6$ cycloaliphatic radical, which can contain $C_6$–$C_{12}$ aromatic, $C_4$–$C_{12}$ cycloaliphatic or $C_3$–$C_{12}$ heterocyclic rings and/or can contain ether, keto, carboxylic acid ester or sulphone bridges, and which can optionally be substituted by halogen, nitro groups or alkoxy groups with $C_1$–$C_{20}$-alkyl radicals.

The index n represents an integer from 1 to 20 and the indices $n_b$ and $n_c$ independently denote an integer from 0 to 20. Examples of (R) are:

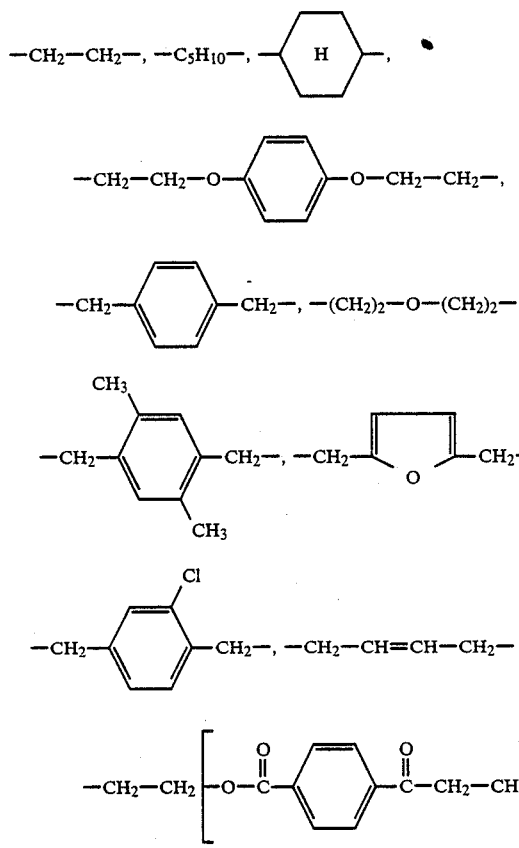

in which $n_d = 1-7$.

Among the suitable monocarboxylic acids of the formula (IV) in accordance with the invention are butyric acid, isobutyric acid, pentanoic acid, 2- and 3-methylpentanoic acids, 2,2-dimethylpropanoic acid, 2-ethylbutanoic acid, 2-ethylhexanoic acid, coconut oil acid, dodecanoic acid, tetradecanoic acid, hexadecanoic acid and stearic acid, cyclohexanecarboxylic acid, 1- or 3-cyclohexene-1-carboxylic acid, benzoic acid, methylbenzoic acid, phenylacetic acid, 4-methylphenylacetic acid, dimethylbenzoic acid, 3-phenyl-2-propenoic acid, 1-naphthalenecarboxylic acid and 1,1-biphenyl-4-carboxylic acid.

High-molecular weight polycarbonates which are suitable according to the invention are in principle all those which have molecular weights $\overline{M}w$ (weight average) between 10,000 and 200,000 (measured by the viscosity in $CH_2Cl_2$ at 25° C. and a concentration of 0.5% by weight or by the light scattering method) and consist of structural units of the formula

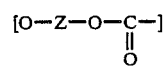

wherein

Z is a derivative of HO—Z—OH which is a diphenol which is free from ester groups, and wherein —Z— is an aromatic radical which is free from ester groups and preferably has 6 to 30 C atoms.

The suitable polycarbonates can be prepared either with or without chain stoppers.

Particularly suitable HO—Z—OH diphenols are those of the formula (VIII)

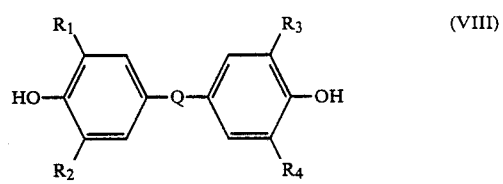

wherein

Q denotes a single bond, —$CH_2$—, $CH_3$—$\overset{|}{\underset{|}{C}}$—$CH_3$,

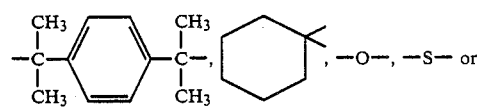

—$SO_2$ and $R_1$ to $R_4$ independently denote H, halogen, such as chlorine or bromine, or $CH_3$.

Examples of suitable diphenols HO—Z—OH are dihydroxydiphenyls, bis-(hydroxphenyl)-alkanes, bis-(hydroxyphenyl)-cycloalkanes, bis-(hydroxyphenyl)-sulphides, bis-(hydroxyphenyl) ethers, bis-(hydroxyphenyl) ketones, bis-(hydroxyphenyl) sulphoxides, bis-(hydroxyphenyl) sulphones and α,α'-bis-(hydroxyphenyl)-diisopropylbenzene, and nuclear-alkylated and nuclear-halogenated compounds thereof. These and other suitable diphenols are described, for example, in U.S. Pat. Nos. 3,028,365, 3,275,601, 3,148,172, 3,062,781 and 2,999,846, in German Offenlegungsschriften (German Published Specifications) Nos. 1,570,703, 2,063,050 and 2,063,052, in French Patent Specification No. 1,561,518 and in the monograph H. Schnell, "Chemistry and Physics of Polycarbonates", Interscience Publishers, New York, 1964, all incorporated by reference herein.

Examples of suitable diphenols are: 4,4'-dihydroxydiphenyl, 2,2-bis-(4-hydroxyphenyl)-propane, bis-(4-hydroxyphenyl)-methane, 2,4-bis-(4-hydroxyphenyl)-2-methylbutane, α,α-bis-(4-hydroxyphenyl)-p-diisopropylbenzene, 2,2-bis-(3-chloro-4-hydroxyphenyl)-propane, bis-(hydroxyphenyl) sulphide and 2,2-bis-(3,5-dimethyl-4-hydroxyphenyl)-propane.

The most important polycarbonates for the process according to the invention are homopolycarbonates and copolycarbonates which have an $\overline{M}w$ between 10,000 and 200,000 and are prepared from 2,2-bis-(4-hydroxyphenyl)-propane, bis-(4-hydroxyphenyl)-methane, 1,1-bis-(4-hydroxyphenyl)-cyclohexane, 4,4-dihydroxydiphenyl, 2,2-bis-(3,5-dichloro-4-hydroxyphenyl)-propane, 2,2-bis-(3,5-dimethyl-4-hydroxyphenyl)-propane, bis-(3,5-dimethyl-4-hydroxyphenyl)-methane, bis-(4-hydroxyphenyl) thioether and 2,2-bis-(3,5-dibromophenyl)-propane, using phenols or alkylphenols as chain stoppers.

According to the invention, it is possible to use either one or several polycarbonates.

The diphenol monoesters of carboxylic acids, in accordance with the invention, are in particular, those of the formula (IVa)

(IVa)

wherein
"A" and "p" have the meaning given in the context of formula (IV) and
—Z— is the aromatic radical which is free from ester groups, preferably has 6 to 30 C atoms and has already been defined.

Further in particular the diphenol monoesters of carboxylic acids are also those of the formula (Va)

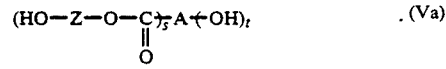
(Va)

wherein meaning given above for
"A", "s" and "t" have the formula (V) and
—Z— has the meaning given for (Iva)

Dicarboxylic acid bis-(diphenol) monoesters according to the invention are also those of the formulae (VIa) and (VIIa)

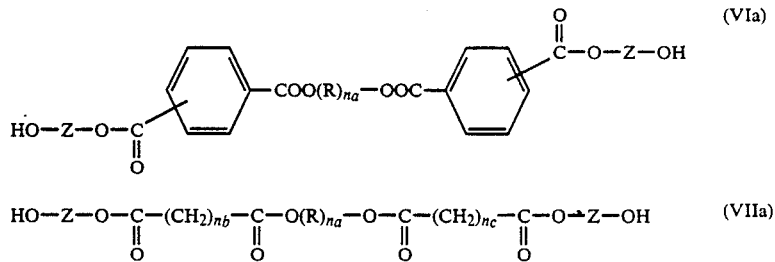

wherein
R, $n_a$, $n_b$ and $n_c$ have the meaning given in the context of carboxylic acids of the formulae (VI) and (VII) and
—Z— has the meaning given above for (Iva).

Examples of dicarboxylic acid bis-(diphenol) monoesters according to the invention are those of the following formulae (VIa$_1$) to (IVa$_8$), "A" having the meaning given for formula (IV).

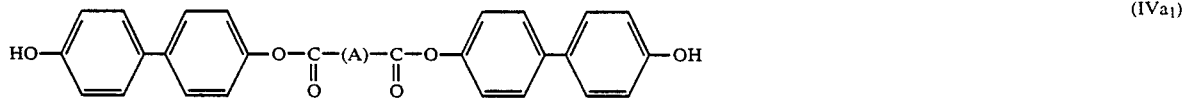

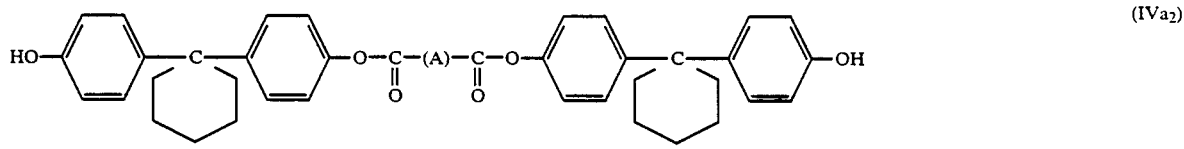

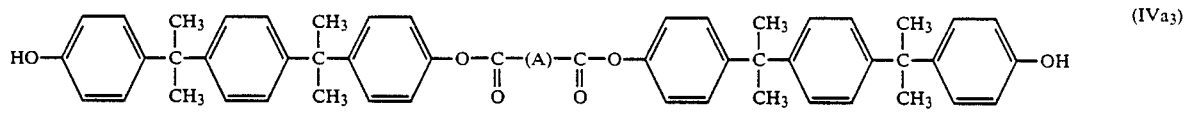

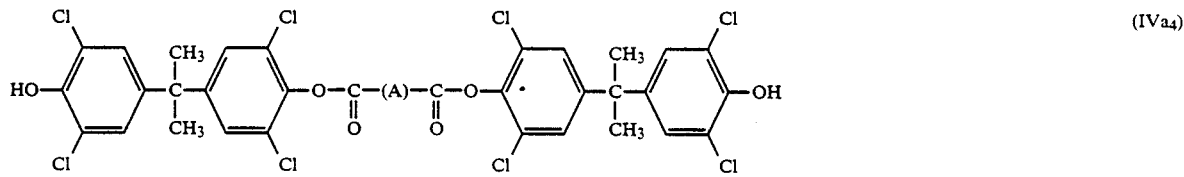

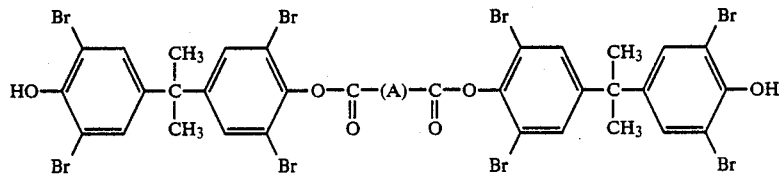 (IVa5)
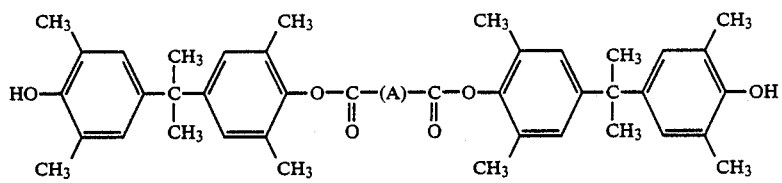 (IVa6)
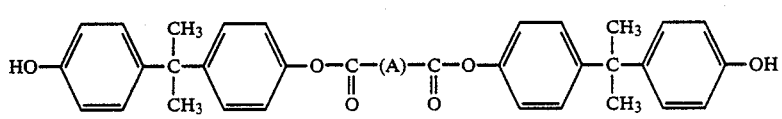 (IVa7)
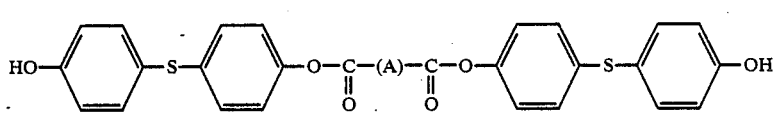 (IVa8)
Examples of diphenol monoesters of carboxylic acids, of the formulae (IVa), (Va), (VIa) and (VIIa) are he following
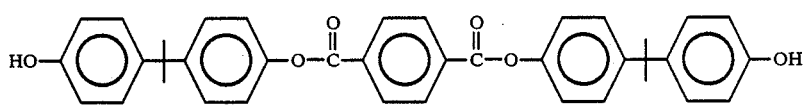 (IVa9) = (III)
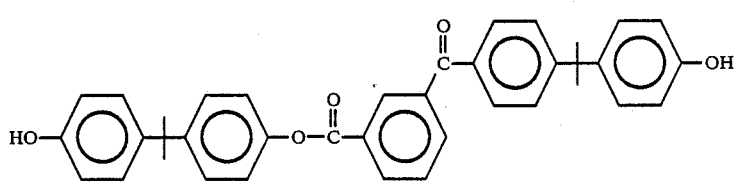 (IVa10)
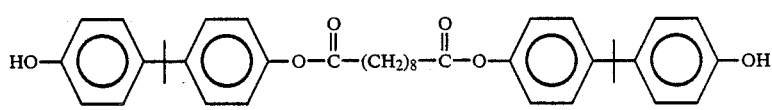 (IVa 11)
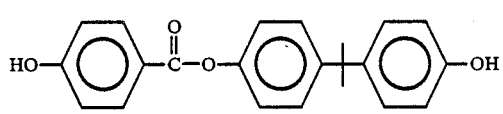 (Va 1)
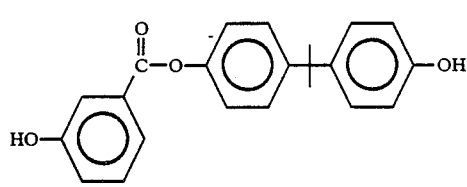 (Va 2)
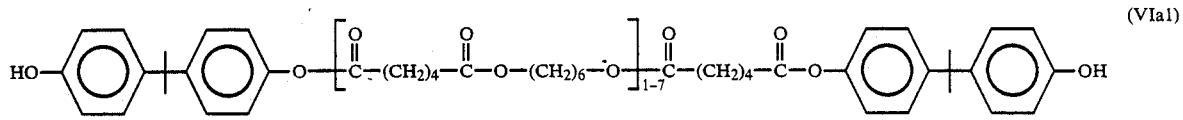 (VIa1)

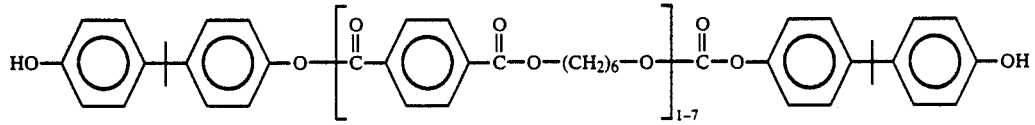
(VIIa 1)

Examples of diphenol monoesters of monocarboxylic acids, of the formula (IVa), wherein p is 1 are the following:

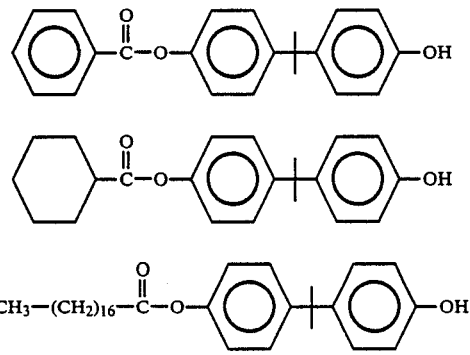

The diphenol monoesters, according to the invention, of carboxylic acids can be used for the preparation of polyester-carbonates by the two-phase boundary process known for polycarbonate synthesis, polyester-carbonates having in each case a certain desired and regular build-up being obtained by choosing defined amounts of defined starting substances.

If the diphenol monoesters have two phenolic OH groups, that is to say are dicarboxylic acid bis-(diphenol) monoesters or monohydroxyarylmonocarboxylic acid (diphenol) monoesters, they can be used as linear chain units: diphenol monoesters of monocarboxylic acids with a phenolic OH group serve as chain limiters and diphenol monoesters of carboxylic acids with a total of three or more than three phenolic OH groups serve as chain branchers.

The present invention thus relates to the preparation of polyester-carbonates from diphenols, phosgene, optionally known amounts of chain stoppers and branching agents, by the known two-phase boundary process at pH values between 9 and 14, at temperatures between 0° C. and 80° C., preferably 15° C. and 40° C., using the customary organic solvents and using any of the customary polycondensation catalysts. The process is characterized in that the diphenol monoesters of carboxylic acids with two phenolic OH groups are in accordance with the invention used as the diphenols, optionally in combination with the ester groups free diphenols HO—Z—OH, optionally also using monocarboxylic acid (diphenol) monoesters with one phenolic OH group as a chain stopper and optionally also using diphenol monoesters of carboxylic acids with three or more than three phenolic OH groups as branching agents, the particular diphenol monoesters of carboxylic acids employed being first dissolved in the organic phase of the two-phase mixture.

The present invention also relates to the polyester-carbonates obtainable by the process according to the invention.

The molar ratio of diphenol monoesters with two phenolic OH groups to ester group free diphenols HO—Z—OH depends on the molecular weight of the diphenol esters employed and is between 1:0.01 and 1:300, preferably between 1:0.05 and 1:150.

The usual monofunctional chain stoppers, such as phenol, alkylphenols or halogenophenols, can be used in addition to or instead of the monocarboxylic acid (diphenol) monoesters with one phenolic OH group; the amount of monofunctional chain stopper is between 0.1 and 20 mol %, preferably between 1 and 5 mol %, based on the amount of diphenol monoesters with two phenolic OH end groups and "free diphenols" employed.

The usual branching agents which are trifunctional or having a functionality greater than three, in particular those with three or more than three phenolic OH groups, can be used in addition to or instead of the diphenol monoesters of carboxylic acids with three or more than three phenolic OH groups, of the present invention.

The amount of the branching agents may be between 0.05 and 2 mol %, based on the moles of diphenols.

Examples of some of the known branching agents are phloroglucinol, 4,6-dimethyl-2,4,6-tri-(4-hydroxyphenol)-heptane, 1,3,5-tri-(4-hydroxyphenyl)-benzene, 1,1,1-tri-(4-hydroxyphenyl)-ethane, tris-(4-hydroxyphenyl)-phenylmethane, 2,2-bis-[4,4-bis-(4-hydroxyphenyl)-cyclohexyl]-propane, tetra-(4-hydroxyphenyl)-methane, 2-(2,4-dihydroxyphenyl)-2-(2,4-dihydroxyphenyl)-propane and 1 4-bis-[4,4''-dihydroxytriphenylmethyl]-benzene.

Of the diphenols of the formula HO—Z—OH which are free from ester groups, which may optionally be used for the preparation of the polyester-carbonates, 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane may preferably be used. Any desired mixtures of these diphenols can also be employed.

Suitable organic solvents for the two-phase boundary process are those known for thermoplastic polycarbonates, such as methylene chloride or chlorobenzene.

Examples of suitable polycondensation catalysts for the two-phase boundary process are the tertiary aliphatic amine catalysts known for polycarbonate synthesis, such as trimethylamine, triethylamine, n-tripropylamine, n-tributylamine or N-ethylpiperidine; the known quaternary ammonium salts, such as, for example, tetrabutylammonium bromide, may also be employed.

Solutions of LiOH, NaOH, KOH, Ca(OH)$_2$ and/or Ba(OH)$_2$ in water are suitable for the preparation of the aqueous-alkaline phase.

The amount of phosgene is between 1 and 3 moles, preferably between 1.1 and 2 moles, per mole of diphenol monoester with two phenolic OH groups and ester group free diphenol.

The reaction times for polyester-carbonate preparation are between 5 minutes and 90 minutes in respect to the phosgenation and between 3 minutes and 3 hours for polycondensation after the addition of the catalyst.

The two-phase boundary process can advantageously be carried out also using 0.1 to 1% by weight, based on the total weight of bifunctional reactants, of reducing alkaline substances, such as sodium borohydride or sodium sulphite.

The solutions of the polyester-carbonates in organic solvents which are obtained by the two-phase boundary process according to the invention are separated off and purified in the manner known for thermoplastic polycarbonates.

The polyester-carbonates prepared are isolated from the organic solutions in a known manner, for example by evaporation of the solution, a devolatilization extruder being used in the last stage of the evaporation.

Other types of isolation may be precipitation by addition of non-solvents or direct casting of the concentrated solutions to films.

The polyester-carbonates of the present invention as a rule have relative solution viscosities of 1.18 to 2.0, in particular of 1.2 to 1.5 (measured in 0.5 g/100 ml of solution in $CH_2Cl_2$ at 25° C.).

The polyester-carbonates of the present invention may be prepared by extrusion as uniform granules, and may be processed to shaped articles by injection-molding. They are also suitable for the production of films and coatings.

The polyester-carbonates of the present invention may be provided, in a known manner during or after their preparation, with the most diverse additives, stabilizers, flameproofing agents and fillers, that is to say with antioxidants, UV stabilizers, mold release agents, organic halogen compounds, alkali metal sulphonates, glass fibers, glass beads, barium sulphate, $TiO_2$ and other additives known for thermoplastic polycarbonates.

The polyester-carbonates of the present invention exhibit an improved flame-resistance, in particular in combination with known flameproofing agents, for example, in combination with potassium perfluorobutanesulphonate and N-methyltetrachlorophthalimide.

The present invention thus also relates to molding compositions comprising the polyester-carbonates obtainable according to the invention, alkali metal salts such as of perfluoroalkanesulphonic acids or arylsulphonic acids in amounts of 0.05–2% by weight and optionally N-alkyltetrachlorophthalimides, polyhalogenodiphenyls, polyhalogenodiphenyl ethers or oligocarbonates of tetra-halogenobisphenol A in amounts of 0.3–5% by weight, in each case based on the total weight of the molding composition.

The polyester-carbonates of the present invention may be used in all applications where thermoplastic aromatic polycarbonates have hitherto been used but where a higher glass transition temperature, that is to say in the range from 150° C. to 175° C., is desirable.

The invention is further illustrated, but is not intended to be limited by the following examples in which all parts and percentages are by weight unless otherwise specified.

In the examples which follow the relative solution viscosity $\eta$ rel has been determined in methylene chloride at 25° C. and at a concentration of 0.5% by weight.

EXAMPLES

I. Preparation of diphenol monoester of carboxylic acids

I.1 Preparation of terephthalic acid bis-[2,2-bis-(4-hydroxyphenyl)-propane]-monoester

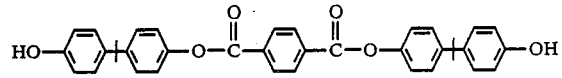

2,490 g of terephthalic acid, 8,010 g of linear bisphenol A polycarbonate (having $\eta$ rel 1.28 and incorporated 89 g phenol as the chain stopper) and 25 g of imidazole are introduced into a stirred autoclave. This mixture is heated to 220° C. in the course of 2 hours, with stirring and under an $N_2$ atmosphere. The mixture is stirred at this temperature for 8 hours and is then heated at 250° C. for 4 hours. During this time, 705 liters of $CO_2$ are split off. A vacuum of 1 mm Hg is then applied. The vitreous, brown-colored product has the following parameters:
Acid number: 0.9
OH number: 178 found
OH number: 190 calculated.

I.2 Preparation of p-hydroxybenzoic acid [2,2-bis-(4-hydroxyphenyl)-propane]-monoester

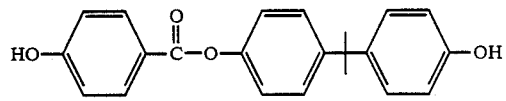

2,071.8 g of p-hydroxybenzoic acid, 4,005 g of a bisphenol A polycarbonate (having $\eta$ rel 1.28 and incorporated 44.5 g phenol as the chain stopper) and 15 g of imidazole are introduced into a stirred autoclave. This mixture is heated to 200° C. in the course of 2 hours, while stirring and under an $N_2$ atmosphere. From about 150° C., splitting off of $CO_2$ starts. The reaction mixture is stirred at this temperature for a further 5 hours until about 330 liters of $CO_2$ have been split off and the acid number is about 1.5. A vacuum of 1 mm Hg is then applied. The vitreous, light colored, transparent product has the following parameters:
Acid number: 1
OH number: 298 found
OH number: 321 calculated.

I.3 Preparation of adipic acid bis-[2,2-bis-(4-hydroxyphenyl)-propane]monoester

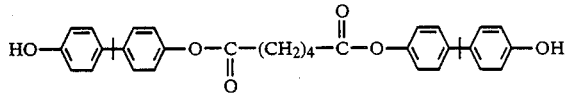

14.6 g of adipic acid, 53.4 g of bisphenol A polycarbonate (having $\eta$ rel 1.28 and incorporated 0.59 g phenol as the chain stopper) and 0.6 g of imidazole are introduced into a stirred autoclave. This mixture is heated to 200° C. in the course of 30 minutes, while stirring. After about 2 hours, splitting off of $CO_2$ has ended. A vacuum of 20 mm Hg is then applied for 1 hour. The vitreous, brown-colored product has the following parameters:

Acid number: 1
OH number: 190 found
OH number: 197.6 calculated.

I.4 Preparation of the bis-[2,2-bis-(4-hydroxyphenyl)-propane]monoester of a hydrogenated dimeric fatty acid.

53.4 g of bisphenol A polycarbonate (having η rel 1.28 and incorporated 0.59 g phenol as the chain stopper), 56 g of a hydrogenated dimeric fatty acid of $\overline{M}n$ 560 (Empol 1010 of Unilever Emery) and 0.6 g of imidazole are introduced into a stirred flask. This mixture is heated to 200° C. in the course of 30 minutes. After 4 hours, splitting off of $CO_2$ has ended. A vacuum of 20 mm Hg is then applied for 1 hour. The brownish, resinous product has the following parameters:
Acid number: 0.5
OH number: 144 found
OH number: 105 calculated.

I.5 Preparation of sebacic acid bis-[2,2-bis-(4-hydroxyphenyl)-propane]monoester

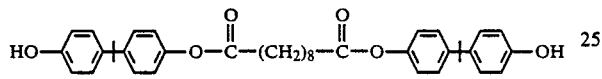

20.2 g of sebacic acid, 53.4 g of bisphenol A polycarbonate (having η rel 1.28 and incorporated 0.59 g phenol as the chain stopper) and 0.6 g of imidazole are introduced into a stirred flask. This mixture is heated to 200° C. in the course of 30 minutes, with stirring. After about 2 hours, splitting off of $CO_2$ has ended. A vacuum of 20 mm Hg is then applied for 1 hour.

The brownish, slightly resinous product has the following parameters:
Acid number: 0.5
OH number: 180 found
OH number: 174 calculated

I.6 Preparation of the bis-[2,2-bis-(4-hydroxyphenyl)-propane]monoester of a hydrogenated dimeric fatty acid hexanediol polyester 120.2 g of a hydrogenated dimeric fatty acid hexanediol polyester containing COOH end groups ($\overline{M}_n$=1,220; OH number=92), 53,4 g bisphenol A polycarbonate (having η rel 1.28 and incorporated 0.59 g phenol as the chain stopper) and 0.6 g of imidazole are introduced into a stirred flask. This mixture is heated to 200° C. in the course of 30 minutes, with stirring. After about 4 hours, splitting off of $CO_2$ has ended. A vacuum of 20 mm Hg is then applied.

The brownish oil has the following parameters:
Acid number: 0.5
OH number: 92 found
OH number: 85 calculated.

I.7 Preparation of a mixture of terephthalic acid bis[2,2-bis-(4-hydroxyphenyl)-propane]monoester and isophthalic acid bis-[2,2-(4-hydroxyphenyl)-propane]monoester in a molar ratio of 1:1

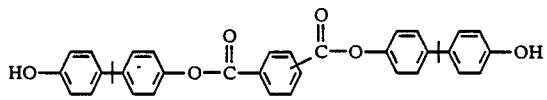

1.245 kg of terephthalic acid, 1.245 kg of isophthalic acid, 8.010 kg of bisphenol A polycarbonate (having η rel 1.28 and incorporated 88.9 g phenol as a the chain stopper) and 7.5 g of imidazole are introduced into a stirred flask. This mixture is heated to 220° C. in the course of 2 hours, with stirring and under an $N_2$ atmosphere. From about 150° C., splitting off of $CO_2$ slowly starts, and becomes more vigorous as the reaction temperature rises. The reaction mixture is stirred at this temperature for a further 11 hours, until about 700 liters of $CO_2$ have been split off and the acid number is 0.6. For further completion of the reaction and removal of free phenol from the reaction mixture, a vacuum of about 1 mm Hg is applied. 380 g of phenol are distilled off in the course of 1 hour under about 1 mm Hg. The vitreous, slightly brown-colored, transparent product has the following parameters:
Acid number: 0.5
OH number: 186–187 found
OH number: 190 calculated.

I.8 Preparation of a mixture according to Example I.7 but in a molar ratio of 3:1

1,245 kg of terephthalic acid, 415 g of isophthalic acid, 5,340.3 g of bisphenol A polycarbonate (having η rel 1.28 and incorporated 59.4 g phenol as the chain stopper) and 15 g of imidazole are introduced into a stirred autoclave. This mixture is heated to 200° C. in the course of 2 hours, with stirring and under an $N_2$ atmosphere. From about 150° C., splitting off of $CO_2$ slowly starts. The reaction mixture is stirred at this temperature for a further 18 hours, while at the same time 470 liters of $CO_2$ are split off, and the acid number towards the end of the reaction is 0.9. A vacuum of 1 mm Hg is then applied in the course of 1 hour. The vitreous, slightly brown-colored, transparent and brittle product has the following parameters:
Acid number: 0.6
OH number: 185–187 found
OH number: 190 calculated.

I.9 Preparation of a mixture according to Example I.7, but in a molar ratio of 9:1

2,241 g of terephthalic acid, 249 g of isophthalic acid, 8,010 g of bisphenol A polycarbonate (having η rel 1.28 and incorporated 89 9 phenol as the chain stopper) and 25 g of imidazole are introduced into a stirred autoclave. This mixture is heated to 220° C. in the course of 2 hours, with stirring and under an $N_2$ atmosphere. The reaction mixture is stirred at this temperature for a further 7 hours, while at the same time 702 liters of $CO_2$ are split off, and the acid number is 0.8. A vacuum of 1 mm Hg at 250° C. is then applied in the course of 1 hour to the product, which is vitreous, brittle and later becomes crystalline. The resulting product has the following parameters:
Acid number: 0.7
OH number: 184–185 found
OH number: 190 calculated.

II. Preparation of polyester-carbonates

II.1 Preparation of a polyester-polycarbonate having the following structural units

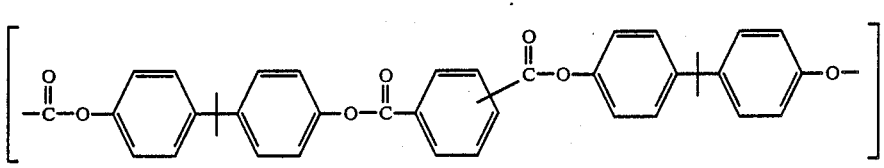

36 liters of distilled water, 1,049 g of 45% strength sodium hydroxide solution and 61.2 g of p-tert.-butylphenol are dissolved in a stirred kettle. A solution of 25.2 liters of methylene chloride, 10.8 liters of chlorobenzene and 4.780 kg of the mixture from Example I.7 is added thereto. 1.612 kg of phosgene are passed in at pH 13 in the course of 40 minutes, with stirring and under a nitrogen atmosphere, while at the same time 1.5 kg of 45% strength sodium hydroxide solution are added dropwise to keep the pH constant at 13. 11.26 ml (1 mol %) of N-ethylpiperidine are then added and the mixture is stirred for one hour. The organic phase is separated off and washed successively with 2% strength phosphoric acid and finally with distilled water until free from electrolytes. By distilling off the methylene chloride, a chlorobenzene solution is obtained, from which the polymer is isolated in a devolatilization extruder at an extruder temperature of 310° C. The relative viscosity of the polyester-carbonate $\eta$ rel is 1.265 (0.5 g in 100 ml of $CH_2Cl_2$) (for the mechanical properties, see the table below).

11.2 Preparation of a polyester-carbonate of 30% by weight of aromatic polyester and 70% by weight of bisphenol A polycarbonate 2.185 kg of bisphenol A, 72.4 g of p-tert.-butylphenol, 36 liters of distilled water and 2.500 kg of 45% strength sodium hydroxide solution are dissolved in a stirred kettle. A solution of 2.456 kg of the mixture of Example I.7, 10.8 liters of chlorobenzene and 25.2 liters of methylene chloride is added thereto. 2.722 kg of phosgene are passed into this reaction mixture at pH 13 and at 20°-25° C. under a nitrogen atmosphere, while at the same time a total of 5.3 kg of 45% strength sodium hydroxide solution are added dropwise to keep the pH constant at 13.

19 ml (1 mol %) of N-ethylpiperidine are then added and the mixture is stirred for 1 hour. The reaction product is worked up as in Example II.1.

The polyester-polycarbonate isolated has the following parameters:
$\eta$ rel = 1.290

(For the mechanical properties, see the table below.)

II.3 Preparation of a polyester-carbonate of 50 mol % of aromatic polyester (75 mol % of terephthalic acid and 25 mol % of isophthalic acid) with 50 mol % of bisphenol A polycarbonate 1,049 g of 45% strength NaOH, 61.2 g of p-tert.-butylphenol and 36 liters of distilled water are introduced into a stirred kettle. A solution of 4,780 kg of the mixture of Example-I.8, 10.8 liters of chlorobenzene and 25.2 liters of methylene chloride is added thereto. 1.612 kg of phosgene are passed in in the course of 40 minutes, with stirring and under a nitrogen atmosphere and with the addition of 1.5 kg of 45% strength NaOH. Further working up is effected as in Example II.1. The relative viscosity of the polyester-carbonate $\eta$ rel. is 1.277. For the mechanical properties, see the table below.

II.4 Preparation of a poyester-carbonate of 30% by weight of aromatic polyester (90 mol % of terephthalic acid and 10 mol % of isophthalic acid) and 70% by weight of bisphenol A polycarbonate 2.185 kg of bisphenol A, 72.4 g of p-tert.-butylphenol, 36 liters of distilled water and 2.5 kg of 45% strength NaOH are dissolved in a stirred kettle. A solution of 2.456 kg of the mixture of Example I.9, 10.8 liters of chlorobenzene and 25.2 liters of methylene chloride is added thereto. 2.722 kg of phosgene are passed into this reaction mixture, with stirring, and the mixture is worked up as in Examples II.1 and II.2. The polyester-polycarbonate isolated has the following parameters:
$\eta$ rel: 1.264

(For the mechanical properties, see the table below.)

II.5 Preparation of a polyester-carbonate of 1 mol of p-hydroxybenzoic acid and 1 mol of bisphenol A 2.133 kg of 45% strength sodium hydroxide solution, 179.9 g of p-tert.-butylphenol and 36 liters of distilled water are introduced into a stirred kettle. A solution of 4,370 g of the p-hydroxybenzoic acid bisphenol A ester from Example I.2, dissolved in 25.2 liters of methylene chloride and 10.8 g of chlorobenzene, is added thereto. 2.370 kg of phosgene are passed in at pH 14 in the course of 30 minutes, with stirring and under an $N_2$ atmosphere, and with addition of 5.2 kg of 45% strength NaOH. 16.5 ml of N-ethylpiperidine are then added and the mixture is then stirred for a further hour. The organic phase is worked up as in Example II.1. The relative viscosity of the polyester-carbonate $\eta$ rel is 1.31. According to differential thermal analysis, the product has a glass transition temperature Tg of 155° C.

TABLE 1

| Example | II.1 | II.3 | II.4 | II.2 |
|---|---|---|---|---|
| 1. Carbonate/ester ratio | (50/50-) | (50/50-) | (70/30-) | (70/30-) |
| 2. Terephthalic acid/isophthalic acid ratio | (50/50) | (75/25) | (90/10) | (50/50) |
| Property: | | | | |
| Yield stress MPa | (a) | 67 | 68 | 63 | 65 |
| Tensile strength MPa | (a) | 58 | 59 | 58 | 56 |
| Elongation at break % | (a) | 73 | 21 | 68 | 25 |

TABLE 1-continued

| Example | | II.1 | II.3 | II.4 | II.2 |
|---|---|---|---|---|---|
| 1. Carbonate/ester ratio | | (50/50-) | (50/50-) | (70/30-) | (70/30-) |
| 2. Terephthalic acid/isophthalic acid ratio | | (50/50) | (75/25) | (90/10) | (50/50) |
| Tensile E modulus MPa | (b) | 2,170 | 2,190 | 2,110 | 2,160 |
| Impact strength kJ/m$^2$ | (c) | not broken | — | — | — |
| Notched impact strength kJ/m$^2$ | (c) | 10 | 9 | 15 | 14 |
| Vicat B temperature | (d) °C. | 164 | 163 | 158 | 155 |
| Second order transition temperature (measured according to Differential thermal analysis) | °C. | 171 | 171 | 161 | 156 |

The properties of the above table were measured in accordance with:
(a) DIN 53455
(b) DIN 53457
(c) DIN 53453
(d) DIN VST/B/50

III. In Table II below, the polyester-carbonates II.2, II.3 and II.4 are compared with a conventional polyester-carbonate. The conventional polyester-carbonate consists of a mixture of terephthalic acid and isophthalic acid with a molar ratio of 1:1 and bisphenol A and has been prepared by the phase boundary process from the acid chlorides of terephthalic acid and isophthalic acid: it has a relative solution viscosity η rel of 1.26. It has been mixed with bisphenol A polycarbonate (η rel: 1.28) with phenyl end groups.

The four polyester-carbonates were mixed on an S 30 Reifenhäuser extruder at 300° C. T$_M$ with 0.1% by weight of potassium perfluorobutanesulphonate and 0.5% by weight of N-methyltetrachlorophthalimide.

TABLE II

| | A<br>Mixture of II.3 +<br>flameproofing agent | B<br>Mixture of II.4 +<br>flameproofing agent | C<br>Mixture of II.2 +<br>flameproofing agent | D<br>Mixture of 30% by weight of conventional polyester-carbonate and 70% by weight of bisphenol A polycarbonate and flameproofing agent |
|---|---|---|---|---|
| UL Subj. 94 | | | | |
| 1.6 mm | V-0; after-burn time: 2 seconds | V-0; after-burn time: 3–4 seconds | V-0; after-burn time: 2 seconds | V-0; after-burn time: 5 seconds |
| 0.8 mm | V-0; after-burn time: 2–3 seconds | V-0; after-burn time: 3 seconds | V-0; after-burn time: 2 seconds | V-2 |

V-0: does not drip/after-burn time shorter than 5 seconds

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. A process for the production of a diphenol monoester of carboxylic acid comprising reacting one or more carboxylic acid with one or more high-molecular weight polycarbonate using 0.001 to 10% relative to the weight of said acid and said polycarbonate of a catalyst selected from the group consisting of 5-membered heterocyclic compounds, amidines, salts of tertiary organic amines, trialkyl ammonium hydroxide, tetraalkyl ammonium hydroxide, and oxides, hydroxides, alcoholates, carbonates, sulphonates, and phosphonates, of alkali metals at a temperature between 150° C. and 350° C., $CO_2$ being split off, in which one diphenol polycarbonate equivalent is employed per carboxylic acid group of the carboxylic acid employed.

2. A process according to claim 1, in which the catalyst is used in an amount of 0.01 to 1% by weight based on the total weight of the reaction mixture employed.

3. A process according to claim I or 2, in which the reaction is carried out at a temperature between 180° C. and 250° C.

4. A process for the production of a diphenol monoester of carboxylic acid comprising reacting one or more carboxylic acid with one or more high-molecular weight polycarbonate using 0.001 to 10% relative to the weight of said acid and said carbonate of a five membered heterocyclic compound as a catalyst at a temperature between 150° C. and 350° C., $CO_2$ being split off, in which one diphenol polycarbonate equivalent is employed per carboxylic acid group of the carboxylic acid employed.

5. The process of claim 4 wherein temperature is between 180° C. and 250° C.

* * * * *